(12) United States Patent
Thompson et al.

(10) Patent No.: US 9,438,761 B1
(45) Date of Patent: Sep. 6, 2016

(54) SHARING DEVICES VIA AN EMAIL

(71) Applicant: Xerox Corporation, Norwalk, CT (US)

(72) Inventors: William Robert Thompson, Woodburn, OR (US); David M. Chapin, Troutdale, OR (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/830,363

(22) Filed: Aug. 19, 2015

(51) Int. Cl.
*G06F 3/12* (2006.01)
*H04N 1/00* (2006.01)

(52) U.S. Cl.
CPC ...... *H04N 1/00973* (2013.01); *H04N 1/00315* (2013.01)

(58) Field of Classification Search
CPC ....... H04L 51/04; H04L 51/26; H04L 67/06; H04N 1/00973; H04N 1/00315; G06F 3/1204; G06F 3/126; G06F 3/1288; G06F 3/1259
USPC ........ 358/1.1, 1.9, 1.13, 1.14, 402; 709/201, 709/203, 205, 217, 226
See application file for complete search history.

(56) References Cited

U.S. PATENT DOCUMENTS

| | | | | |
|---|---|---|---|---|
| 2008/0160994 A1* | 7/2008 | Ala-Vannesluoma | | H04W 80/04 455/432.1 |
| 2011/0161428 A1* | 6/2011 | Hu | ............................. | G06F 9/54 709/206 |
| 2012/0265803 A1* | 10/2012 | Ha | ...................... | G06F 17/30283 709/203 |
| 2013/0321831 A1* | 12/2013 | Srinivasmurthy | .... | G06F 3/1204 358/1.13 |
| 2014/0129652 A1* | 5/2014 | Chan | ....................... | H04L 67/06 709/206 |

\* cited by examiner

*Primary Examiner* — Gabriel Garcia

(57) ABSTRACT

A method, non-transitory computer readable medium and apparatus for automatically installing a connection to a device on a recipient endpoint device via an email are disclosed. For example, the method includes opening a device list application on an endpoint device, wherein the device list application includes one or more devices that are connected to the endpoint device, receiving an indication to share the one or more devices with the recipient endpoint device, opening an email interface with an attachment containing information associated with the one or more devices, receiving an email address associated with the recipient endpoint device and transmitting the email with the attachment, wherein the attachment is for automatically installing the connection to the one or more devices on the recipient endpoint device when the attachment is activated within a second device list application that is opened on the recipient endpoint device.

13 Claims, 6 Drawing Sheets

SHARING DEVICES VIA AN EMAIL

The present disclosure relates generally to sharing devices and, more particularly, to a method and apparatus for automatically installing a connection to a device on an endpoint via an email.

BACKGROUND

Adding a printer to a device can be a difficult process. Local printers can be installed using a device driver or protocols to automatically locate the local printer. However, installing or connecting to a shared network printer can be a more difficult process.

For example, finding a shared network printer can be a manual process that requires one to find the network path of a shared network printer. Some methods have helped to improve this process by using quick response (QR) codes on a printer that can be scanned to collect the printer information. However, not all users may be near the QR code to scan the information.

SUMMARY

According to aspects illustrated herein, there are provided a method, non-transitory computer readable medium and apparatus for automatically installing a connection to a device on a recipient endpoint device via an email. One disclosed feature of the embodiments is a method that opens a device list application on an endpoint device, wherein the device list application includes one or more devices that are connected to the endpoint device, receives an indication to share the one or more devices with the recipient endpoint device, opens an email interface with an attachment containing information associated with the one or more devices, receives an email address associated with the recipient endpoint device and transmits the email with the attachment, wherein the attachment is for automatically installing the connection to the one or more devices on the recipient endpoint device when the attachment is activated within a second device list application that is opened on the recipient endpoint device.

Another disclosed feature of the embodiments is a non-transitory computer-readable medium having stored thereon a plurality of instructions, the plurality of instructions including instructions which, when executed by a processor, cause the processor to perform operations that open a device list application on an endpoint device, wherein the device list application includes one or more devices that are connected to the endpoint device, receive an indication to share the one or more devices with the recipient endpoint device, open an email interface with an attachment containing information associated with the one or more devices, receive an email address associated with the recipient endpoint device and transmit the email with the attachment, wherein the attachment is for automatically installing the connection to the one or more devices on the recipient endpoint device when the attachment is activated within a second device list application that is opened on the recipient endpoint device.

Another disclosed feature of the embodiments is an apparatus comprising a processor and a computer-readable medium storing a plurality of instructions which, when executed by the processor, cause the processor to perform operations that open a device list application on an endpoint device, wherein the device list application includes one or more devices that are connected to the endpoint device, receive an indication to share the one or more devices with the recipient endpoint device, open an email interface with an attachment containing information associated with the one or more devices, receive an email address associated with the recipient endpoint device and transmit the email with the attachment, wherein the attachment is for automatically installing the connection to the one or more devices on the recipient endpoint device when the attachment is activated within a second device list application that is opened on the recipient endpoint device.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for automatically installing a connection to a device on a recipient endpoint device via an email from a perspective of a transmitting endpoint device. As discussed above, adding a printer to a device can be a difficult process. Local printers can be installed using a device driver or protocols to automatically locate the local printer. However, installing or connecting to a shared network printer can be a more difficult process.

For example, finding a shared network printer can be a manual process that requires one to find the network path of a shared network printer. Some methods have helped to improve this process by using quick response (QR) codes on a printer that can be scanned to collect the printer information. However, not all users may be near the QR code to scan the information.

Embodiments of the present disclosure provide a method for automatically installing a connection to a device on a recipient endpoint device via an email. For example, rather than requiring each user to search for a shared network device and obtain specific information related to the shared network device required to install the device on the endpoint device, a first user may simply share devices within a device list application. An email may be automatically generated containing an attachment containing the one or more devices that are shared. The first user may enter an email address and send the email to a second user of a recipient endpoint device. The second user may simply click on the attachment to activate the attachment that automatically installs the one or more devices onto the recipient endpoint device.

Notably, the second user is not required to search or obtain any information related to the devices. Rather, the second user simply clicks on an email attachment and the device list application running on the recipient endpoint device processes the attachment and performs the installation of the devices or connections to the devices on the recipient endpoint device.

Figure 1:
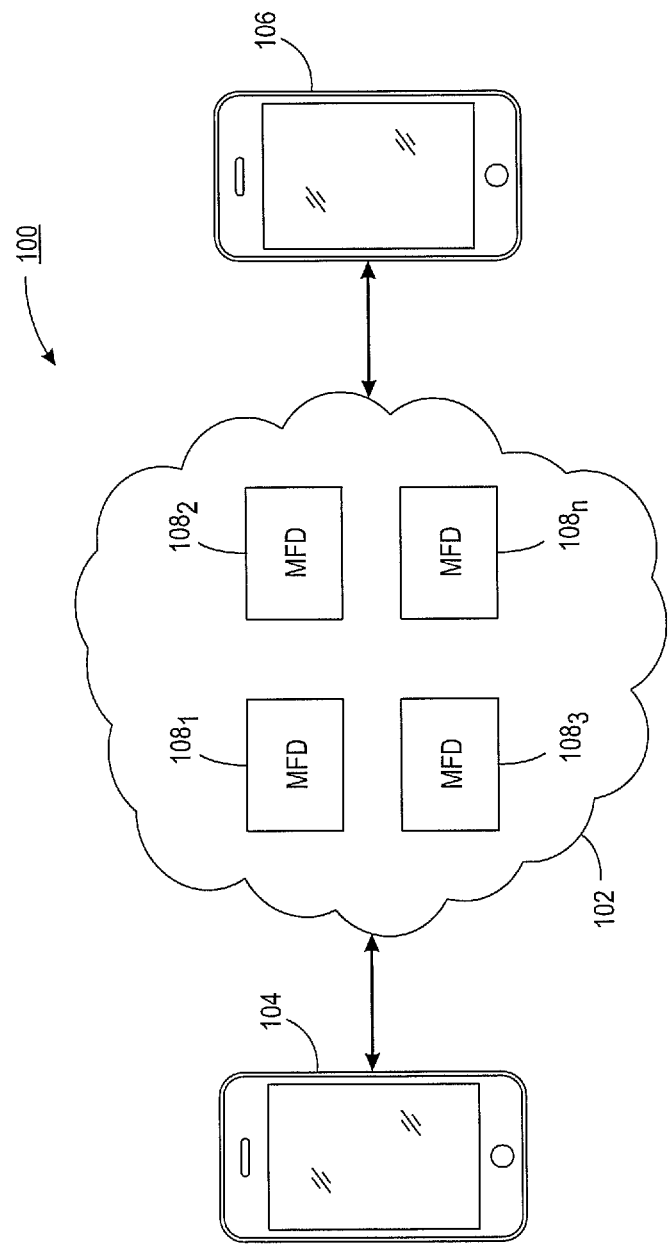
FIG. 1 illustrates an example block diagram of a system of the present disclosure.

FIG. 1 illustrates an example system 100 of the present disclosure. In one embodiment, the system 100 includes an Internet Protocol (IP) network 102. The IP network 102 may be any type of network including, for example, a cellular network, a broadband network, and the like.

It should be noted that the IP network 102 has been simplified for ease of explanation. The IP network 102 may include additional access networks or network elements not shown. For example, the additional network elements may include a gateway, a router, a switch, a firewall, an application server, and the like.

In one embodiment, the IP network 102 may include one or more devices 108-1 to 108-n. In one embodiment, the devices 108-1 to 108-n maybe multi-function devices (MFDs) 108-1 to 108-n (herein referred to individually as MFD 108 or collectively as MFDs 108). In one embodiment, an MFD may be any type of hardware device that is capable of performing two or more functions. For example, the functions may include printing, faxing, photocopying, scanning, and the like. The MFDs 108 may be accessible via either wired or wireless connection.

In one embodiment, the MFDs 108 may be located together at a same location (e.g., an office building of an enterprise or company). In another embodiment, the MFDs 108 may be located at different locations. In one embodiment, the MFDs 108 may be located in a single building, but at different locations throughout the building (e.g., different floors, different departments, and the like).

In one embodiment, the system 100 may include a transmitting endpoint device 104 and a recipient endpoint device 106. Although only a single transmitting endpoint device 104 and a single recipient endpoint device 106 are illustrated in FIG. 1, it should be noted that any number of transmitting endpoint devices 104 and any number of recipient endpoint devices 106 may be deployed.

In one embodiment, the transmitting endpoint device 104 and the recipient endpoint device 106 may be any type of endpoint device. Example endpoint devices may include a mobile telephone, a smart phone, a tablet computer, a laptop computer, a desktop computer, and the like. In one embodiment, the transmitting endpoint device 104 and the recipient endpoint device 106 may be in communication with the IP network 102 via either a wired or wireless connection.

In one embodiment, the transmitting endpoint device 104 and the recipient endpoint device 106 may execute or run a device list sharing application (e.g., Xerox® Mobile Link app). In one embodiment, the transmitting endpoint device 104 may establish a connection to one or more of the devices 108-1 to 108-n. In one embodiment, the connection may include an IP address of the device 108, a name of the device 108 and a model type of the device 108. In one embodiment, the IP address may be a host name/universal resource locator (URL) (www.printer123.com) that is resolved by a domain name server (DNS) to translate the host name to an IP address of the printer.

In one embodiment, the transmitting endpoint device 104 may be associated with a network administrator of an enterprise. The network administrator may designate which recipient endpoint device 106 or devices 106 may receive a shared device list for automatically establishing a connection to one or more of the devices 108.

Figure 2:
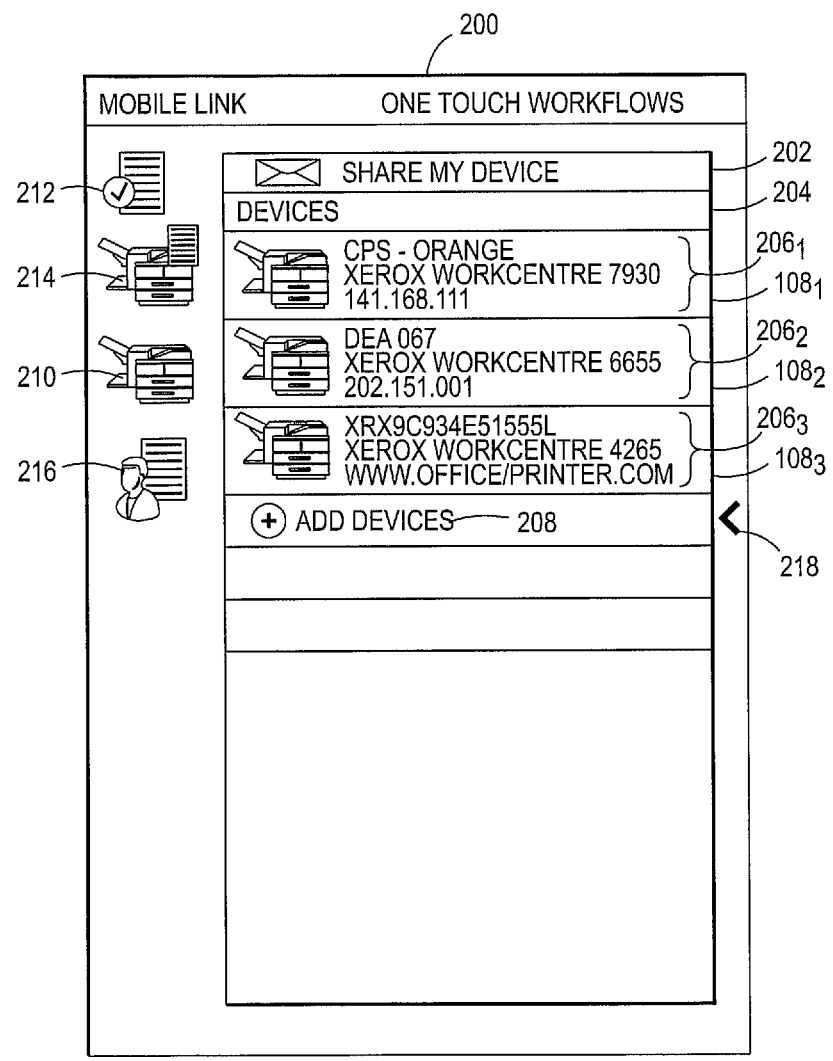
FIG. 2 illustrates an example screenshot of a user interface of a device list application.

FIG. 2 illustrates an example screenshot 200 of a user interface of an example device list sharing application. The user interface may include an icon 212 to read a document, an icon 214 to print a document, an icon 210 to add a device, an icon 216 to send a document to another user and an icon 218 to go back a screen. It should be noted that other icons may be available in addition to printing (e.g., scanning, faxing, sharing, and the like). When the icon 210 is selected, the screenshot 200 includes a device list 204. The screenshot 200 includes a share my device button 202, list of devices 108-1 to 108-3 in the device list 204 and an add devices button 208.

As noted above, each one of the devices 108-1 to 108-3 may include information 206-1 to 206-3 (herein referred to individually as information 206 or collectively as information 206) associated with the device. For example, the information 206 may include an IP address of the device, a device name, a model type of the device, and the like.

In one embodiment, the transmitting endpoint device 104 may initially add one or more devices 108 in the device list 204 of the device list application. The devices 108-1 to 108-3 may be added by searching for an IP address of the device 108, scanning a QR code displayed on a device 108, and the like. Notably, the networked devices 108 are not added by using a file path or path name as traditionally done in certain operating systems.

After the transmitting endpoint device 104 has added one or more devices 108, a user of the transmitting endpoint device 104 may share the devices with another user of the recipient endpoint device 106. For example, the user of the recipient endpoint device 106 may be located in another location, but may occasionally print to a printer (e.g., device 108-1) that is located near the user of the transmitting endpoint device 104. However, the user of the recipient endpoint device 106 is not at the location and cannot scan the QR code or does not know what the IP address of the device 108-1 is.

As a result, the user of the transmitting endpoint device 104 may select the share my devices button 202 to share one or more of the devices 108-1 to 108-3 with another user. In one example, when the share my devices button 202 is selected, an email interface may be opened.

Figure 3:
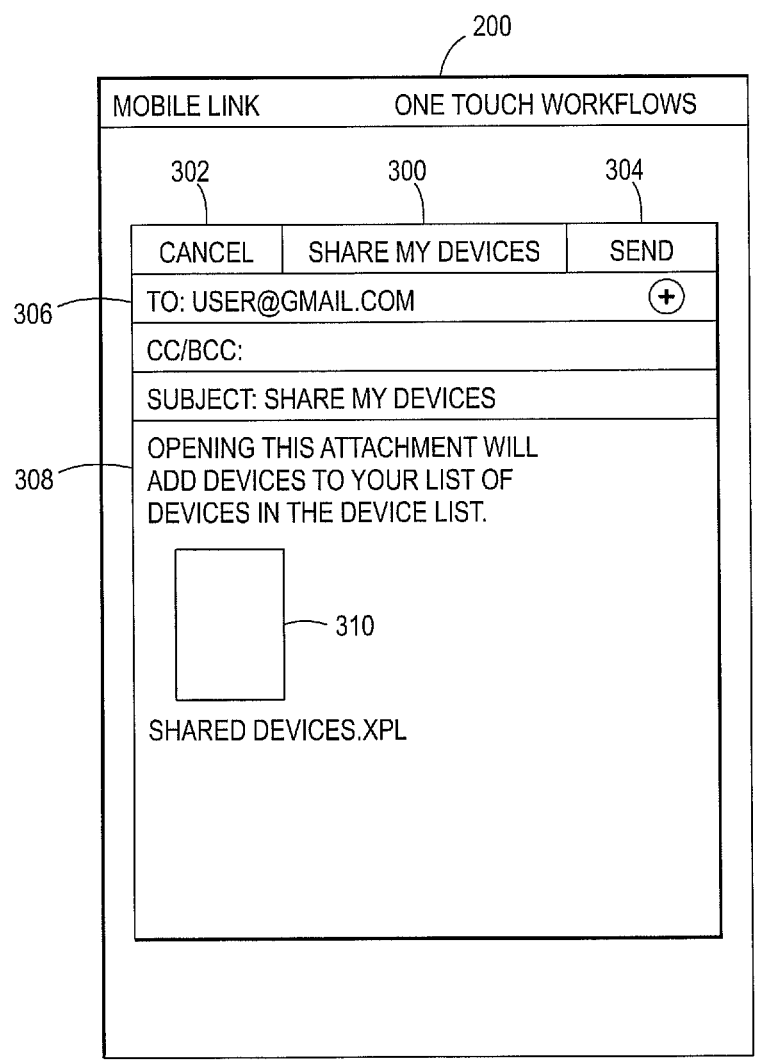
FIG. 3 illustrates a second example screenshot of the user interface of a device list application.

FIG. 3 illustrates an example email interface of the device list application. The email interface may generate an email 300. The email may include a cancel button 302, a send button 304, a to: address line 306 and a message portion 308. In one embodiment, when the user of the transmitting endpoint device 104 selects the share my devices button 202, the device list application may automatically select all of the devices 108 and create an attachment 310.

In another example, when the user of the transmitting endpoint device 104 selects the share my devices button 202, the device list application may provide an option to select one or more of the devices 108. In other words, selection of the share my devices button 202 allows for individual selection of one or more of the devices 108-1 to 108-3. For example, checkboxes, radio buttons, and the like, may appear next to the devices 108-1 to 108-3 in the screenshot 200. The user may select the desired devices (e.g., 108-1 and 108-2), continue and the device list application may automatically generate the email 300 with the attachment 310.

In one embodiment, after the email 300 is sent to the recipient endpoint device 106, the user may simply select the attachment 310 to activate the attachment 310. The attachment 310 may include the information 206 for the selected devices 108. The device list application running on the recipient endpoint device 106 may read the information 206 in the attachment 310 and automatically install a connection to each one of the devices 108. In other words, if the attachment 310 includes information 206-1 to 206-3 for devices 108-1 to 108-3, then when the attachment 310 is activated by the recipient endpoint device 106, a connection to each one of the devices 108-1 to 108-3 would automatically be installed. The connection may be either a wired or wireless connection to the selected devices 108.

In one embodiment, the attachment 310 may be a Xerox® Device List (.XDL) file. For example, the information 206 may be assembled into an array of dictionaries that is encoded into binary data using a JavaScript Object Notation (JSON). The encoded file may then be attached to the email 300 as an .XDL file attachment 310.

As a result, the embodiments of the present disclosure remove a burden of a user of the recipient endpoint device 106 from having to find or type in an IP address of a device 108. Rather, the user of the recipient endpoint device 106 may simply activate the attachment 310 and a connection to the devices 108 associated with the information 206 in the attachment 310 may be automatically installed.

Previously, a user would have been required to know a device path (e.g., COMPANY/PRINTERS/ACCOUNTING/PRINTER1) to install a connection to a networked device. Typically, most employees or users do not know the file path of the device or some devices may be located remotely from the user and the user is unable to read a QR code or a label that has the device path on the device. Notably, the networked devices 108 of the present disclosure do not require a device path, but rather, an IP address or host name/URL of the device 108 can be used to install a connection to the device 108.

Figure 4:
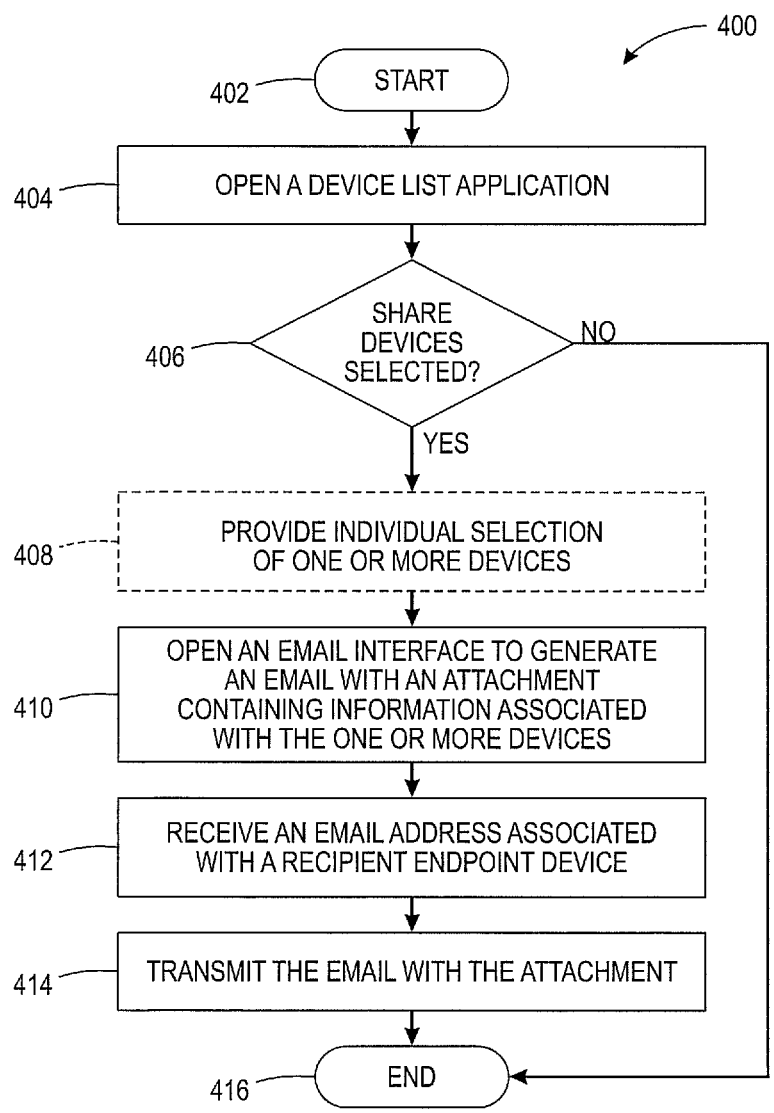
FIG. 4 illustrates an example flowchart of a method for automatically installing a connection to a device on a recipient endpoint device via an email from a perspective of a transmitting endpoint device.
Figure 6:
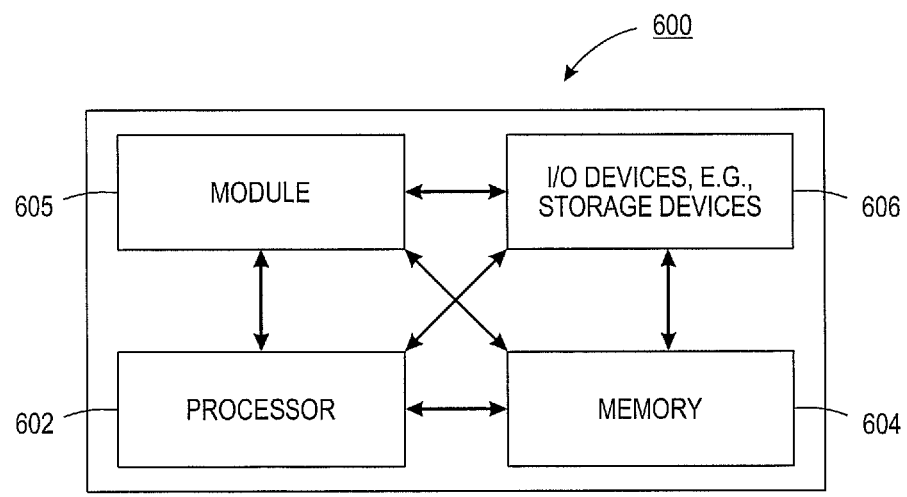
FIG. 6 illustrates a high-level block diagram of a computer suitable for use in performing the functions described herein.

FIG. 4 illustrates a flowchart of a method 400 for automatically installing a connection to a device on a recipient endpoint device via an email from a perspective of a transmitting endpoint device. In one embodiment, one or more steps, or operations, of the method 400 may be performed by the transmitting endpoint device 104 or a computer as illustrated in FIG. 6 and discussed below.

At block 402 the method 400 begins. At block 404, the method 400 opens a device list application. In one example, the device list application is opened on a transmitting endpoint device. The device list application may include one or more devices that are connected to the endpoint device. In one embodiment, the one or more devices may have been previously connected to the transmitting endpoint device in advance. For example, the connection to the one or more devices may have been previously established using a respective IP address of each one of the one or more devices. After the connection is established, the device may be added to the device list of the device list application.

At block 406, the method 400 determines if a share devices button has been selected. For example, an interface of the device list application may provide a share device button that initiates a process to automatically create an attachment in an email to share the devices in the device list of the device list application.

If the answer is no, the method 400 proceeds to block 416 where the method 400 ends. However, if the answer is yes, the method 400 may proceed to optional block 408 or directly to block 410.

At optional block 408, the method 400 may provide individual selection of one or more devices. For example, a radio button or a check box may appear next to each device. The user may then select which devices that he or she would like to share. In other words, a subset of the one or more devices may be shared.

In another example, if optional block 408 is not executed, all of the devices are selected when the share devices button is selected. In other words, the user is not provided an option to allow for individual selection of the one or more devices.

At block 410, the method 400 opens an email interface to generate an email with an attachment containing information associated with the one or more devices. In one embodiment, the information associated with the one or more devices may include a name of the device, an IP address of the device, a model type of the device, and the like. In one embodiment, other information may also be included, such as for example, a location of the device, and the like. It should be noted that the types of information provided above are only examples and other types of information are within the scope of the present disclosure.

In one embodiment, the information associated with each device may be assembled into an array of dictionaries. The array may be encoded in a JavaScript Object Notation (JSON) format. The JSON encoded array may then be encoded into binary data for an email attachment. The JSON encoded array may then be attached to the email as a Xerox® Device List (.XDL) file.

At block 412, the method 400 may receive an email address associated with a recipient endpoint device. For example, the only manual portion of the automated process may be to include an email address associated by the recipient endpoint device. Otherwise, a single click of the share device button automatically performs all of the steps for installing a connection to a device on the recipient endpoint device via an email.

At block 414, the method 400 may transmit the email with the attachment. In one embodiment, the attachment automatically installs a connection to the one or more devices on the recipient endpoint device when the attachment is activated within the device list application that is opened on the recipient endpoint device. For example, a user of the recipient endpoint device may click on the attachment to activate the attachment and cause the installation of the connection to each one of the one or more devices. In one example, the connection may be a wired or wireless connection. At block 416 the method 400 ends.

Figure 5:
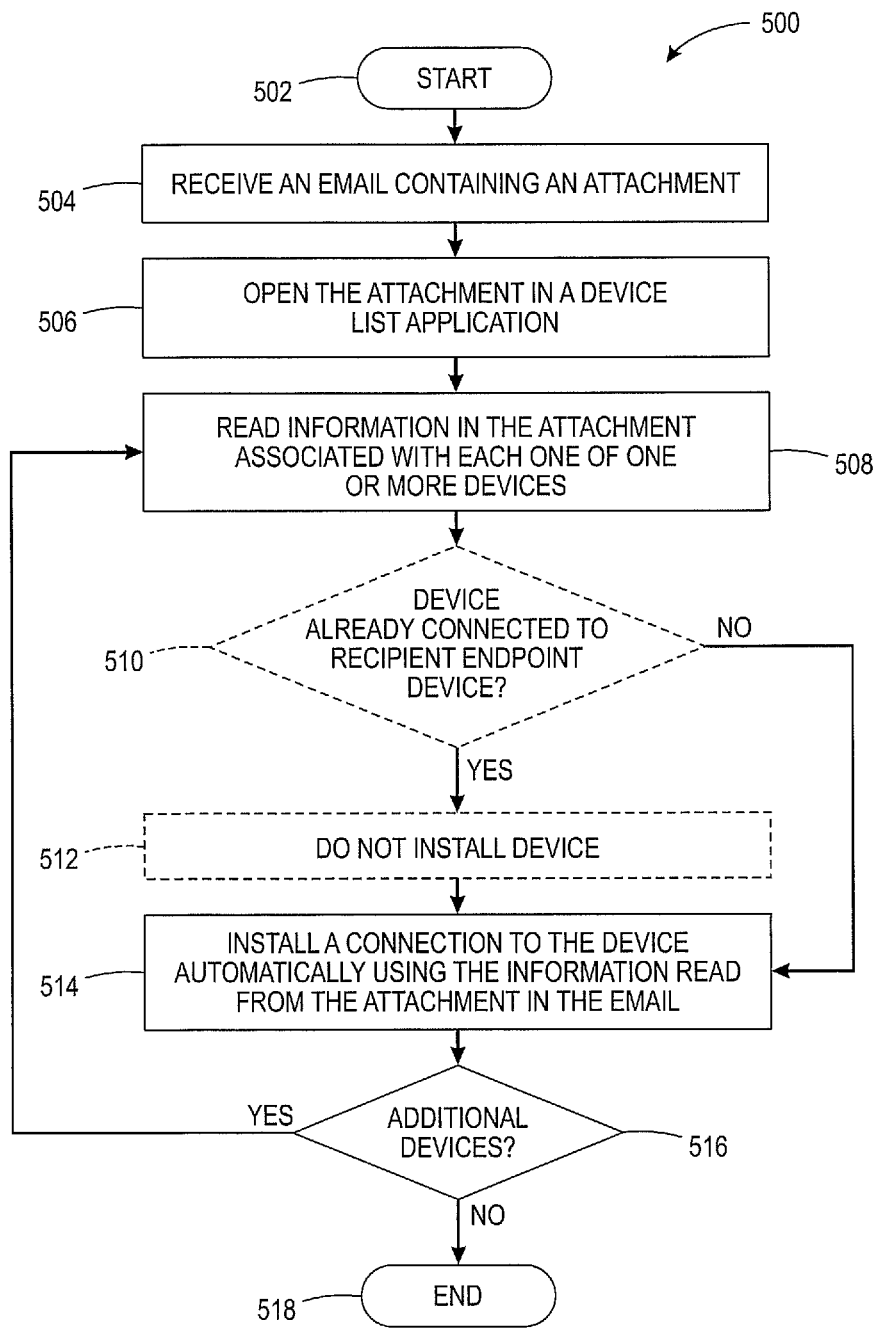
FIG. 5 illustrates an example flowchart of a method for automatically installing a connection to a device on a recipient endpoint device via an email from a perspective of a recipient endpoint device.

FIG. 5 illustrates a flowchart of a method 500 for automatically installing a connection to a device on a recipient endpoint device via an email from a perspective of a recipient endpoint device. In one embodiment, one or more steps, or operations, of the method 500 may be performed by the recipient endpoint device 106 or a computer as illustrated in FIG. 6 and discussed below.

At block 502 the method 500 begins. At block 504, the method 500 receives an email containing an attachment. In one embodiment, the attachment may be a .XDL file that contains an array of dictionaries of the devices that are being shared encoded in a JSON format.

At block 506, the method 500 opens the attachment in a device list application. For example, the attachment may be associated with the device list application and may require the device list application to execute, process or read the information contained in the attachment.

At block 508, the method 500 reads information in the attachment associated with each one of one or more devices. For example, the information may include information to automatically install connections to the one or more devices on the recipient endpoint device. In one embodiment, the information associated with the one or more devices may include a name of the device, an IP address of the device, a model type of the device, and the like. In one embodiment, other information may also be included, such as for example, a location of the device, and the like. It should be noted that the types of information provided above are only examples and other types of information are within the scope of the present disclosure.

At optional block 510, the method 500 may determine if a device is already connected to the recipient endpoint device. For example, the optional block 510 may be performed to avoid installing duplicate connections to the same device.

If the answer to optional block 510 is yes, the method 500 may proceed to optional block 512. At optional block 512, the method 500 does not install the device. In other words, if a device that is included in the attachment already has a connection to the device installed on the recipient endpoint device, then the device does not need to be installed again. The method 500 may then proceed to block 514.

However, if the answer to optional block 510 is no, the method 500 may proceed to block 514. The method 500 may arrive at block 514 either directly from 508 if the optional blocks 510 and 512 are not performed or from block 512.

At block 514, the method 500 installs a connection to the device automatically using the information read from the attachment in the email. For example, no manual intervention is required by a user associated with the recipient endpoint device after clicking on the attachment. In other words, the user is not required to look for an IP address of the device or provide a path name to the device to install a connection to the device. Rather, the user simply clicks on the attachment in the email and a connection to each one of the devices shared by a transmitting endpoint device is automatically installed on the recipient endpoint device.

At block 516, the method 500 determines if there are additional devices. If there are additional devices, the method 500 may return to block 508 to read information associated with the next device. Then blocks 510-516 may be repeated.

However, if there are no additional devices, the method 500 may proceed to block 518. At block 518 the method 500 ends.

It should be noted that although not explicitly specified, one or more steps, functions, or operations of the methods 400 and 500 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIGS. 4 and 5 that recite a determining operation, or involve a decision, do not necessarily require that both branches of the determining operation be practiced. In other words, one of the branches of the determining operation can be deemed as an optional step.

As a result, the embodiments of the present disclosure improve the functioning of a computer or a device. For example, the functioning of a computer may be improved to automatically install a connection to a device on a recipient endpoint device via an email. In other words, installing a connection to an MFD on an endpoint device is automated. In addition, the embodiments of the present disclosure transform an email attachment into a command for installing a connection to one or more devices on a recipient endpoint device, as discussed above. Notably, no previous machine or computer was capable of performing the functions described herein as the present disclosure provides an improvement in the technological arts of printing.

FIG. 6 depicts a high-level block diagram of a computer that can be transformed to into a machine that is dedicated to perform the functions described herein. Notably, no computer or machine currently exists that performs the functions as described herein. As a result, the embodiments of the present disclosure improve the operation and functioning of the computer to provide automatic installation of a connection to a device on a recipient endpoint device via an email, as disclosed herein.

As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for automatically installing a connection to a device on a recipient endpoint device via an email, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for automatically installing a connection to a device on a recipient endpoint device via an email (e.g., a software program comprising computer-executable instructions) can be loaded into memory 604 and executed by hardware processor element 602 to implement the steps, functions or operations as discussed above in connection with the exemplary methods 400 and 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s)

can be perceived as a programmed processor or a specialized processor. As such, the present module 605 for automatically installing a connection to a device on a recipient endpoint device via an email (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for automatically installing a connection to a device on a recipient endpoint device via an email, comprising:
    opening, by a processor, a device list application on an endpoint device, wherein the device list application includes one or more devices that are connected to the endpoint device;
    receiving, by the processor, an indication to share the one or more devices with the recipient endpoint device;
    opening, by the processor, an email interface to generate the email with an attachment containing information associated with the one or more devices;
    receiving, by the processor, an email address associated with the recipient endpoint device; and
    transmitting, by the processor, the email with the attachment, wherein the attachment is for automatically installing the connection to the one or more devices on the recipient endpoint device when the attachment is activated within a second device list application that is opened on the recipient endpoint device.

2. The method of claim 1, wherein the one or more devices comprise multi-function devices (MFDs).

3. The method of claim 1, wherein the one or more devices are connected to the endpoint device via a wired or wireless connection.

4. The method of claim 1, wherein the indication comprises a selection of a share device button in the device list application on the endpoint device.

5. The method of claim 4, wherein the selection of the share devices button automatically selects all of the one or more devices.

6. The method of claim 4, wherein the selection of the share devices button allows for individual selection of the one or more devices.

7. The method of claim 1, wherein the information comprises a name of the device, an internet protocol (IP) address of the device and a model type of the device.

8. The method of claim 1, wherein the attachment is encoded in a JavaScript Object Notation (JSON).

9. The method of claim 1, wherein the attachment is a Xerox Device List (.XDL) file.

10. A method for automatically installing a connection to a device on a recipient endpoint device via an email, comprising:
    establishing, by a processor, a connection to one or more multi-function devices (MFDs) using an internet protocol (IP) address of the one or more MFDs;
    adding, by the processor, the one or more MFDs that are connected in a device list of a device list application running on an endpoint device;
    receiving, by the processor, an indication that a share devices button is selected in the device list application;
    assembling, by the processor, the one or more MFDs into an array of dictionaries that contains a name, an IP address and a model type of each one of the one or more MFDs;
    encoding, by the processor, the array into a JavaScript Object Notation (JSON) format;
    opening, by the processor, an email interface to create the email;
    attaching, by the processor, the array encoded into the JSON format as a Xerox device list (.XDL) file in the email;
    receiving, by the processor, an email address associated with the recipient endpoint device; and
    transmitting, by the processor, the email with the attachment, wherein the attachment is for automatically installing a connection to the one or more MFDs on the recipient endpoint device when the attachment is activated within a second device list application that is opened on the recipient endpoint device.

11. The method of claim 10, further comprising:
    selecting, by the processor, all of the one or more MFDs when the share devices button is selected.

12. The method of claim 10, further comprising:
    providing, by the processor, an option for individual selection of the one or more MFDs.

13. The method of claim 10, wherein the connection comprises a wired or wireless connection.

* * * * *